US010605388B2

(12) United States Patent
MacConnell et al.

(10) Patent No.: US 10,605,388 B2
(45) Date of Patent: Mar. 31, 2020

(54) HYBRID WASTE TUBE ASSEMBLY

(71) Applicant: Exotic Metals Forming Company LLC, Kent, WA (US)

(72) Inventors: James MacConnell, Seattle, WA (US); Karl D'Ambrosio, Shoreline, WA (US)

(73) Assignee: Exotic Metals Forming Company LLC, Kent, WA (US)

( * ) Notice: Subject to any disclaimer, the term of this patent is extended or adjusted under 35 U.S.C. 154(b) by 735 days.

(21) Appl. No.: 15/197,591

(22) Filed: Jun. 29, 2016

(65) Prior Publication Data
US 2017/0002963 A1    Jan. 5, 2017

Related U.S. Application Data

(60) Provisional application No. 62/187,098, filed on Jun. 30, 2015.

(51) Int. Cl.
*F16L 25/01* (2006.01)
*B64D 11/00* (2006.01)
*F16L 23/06* (2006.01)

(52) U.S. Cl.
CPC .............. *F16L 25/01* (2013.01); *B64D 11/00* (2013.01); *F16L 23/06* (2013.01)

(58) Field of Classification Search
CPC ........... F16L 25/01; F16L 23/06; F16L 23/04; B64D 11/00
See application file for complete search history.

(56) References Cited

U.S. PATENT DOCUMENTS

| | | | | |
|---|---|---|---|---|
| 2,347,897 A | * | 5/1944 | Febrey | ................... F16L 25/01 |
| | | | | 439/192 |
| 4,900,070 A | | 2/1990 | Runkles et al. | |
| | | (Continued) | | |

FOREIGN PATENT DOCUMENTS

| | | |
|---|---|---|
| EP | 2261543 A2 | 12/2010 |
| EP | 2682659 A1 | 1/2014 |

OTHER PUBLICATIONS

European Patent Office, Communication pursuant to Article 94(3) EPC, EP Patent Application 16751041.1, dated Feb. 22, 2019, 6 pages.

(Continued)

*Primary Examiner* — Anna M Momper
*Assistant Examiner* — James A Linford
(74) *Attorney, Agent, or Firm* — Renner, Otto, Boisselle & Sklar, LLP

(57) ABSTRACT

The present technology is directed to a conductive hybrid waste tube system that comprises tube bodies, tube end fittings, O-rings, coupling sleeves, end fitting adapters and couplings. The tube bodies and tube end fittings are attached and constitute a tube section. O-rings are installed between flanges on the end fittings and the sleeve positioned over the end fittings of adjoining tube sections. If the tubes end fittings are of different designs, an end fitting adapter may be used along with an additional O-ring to provide pressure sealing. The coupling is installed over the completed assembly to prevent the joint from separating. The O-rings/sleeve combination provides the ability for the tube sections to translate and rotate relative to each other while the coupling prevents the joint from excessive translation.

13 Claims, 5 Drawing Sheets

(56) References Cited

U.S. PATENT DOCUMENTS

| | | | | |
|---|---|---|---|---|
| 5,871,239 A | * | 2/1999 | Boscaljon | F16L 19/005 |
| | | | | 285/354 |
| 5,959,828 A | * | 9/1999 | Lewis | F16L 25/01 |
| | | | | 361/212 |
| 6,050,609 A | * | 4/2000 | Boscaljon | F16L 19/005 |
| | | | | 285/354 |
| 2012/0286505 A1 | * | 11/2012 | Barre | F16L 25/01 |
| | | | | 285/47 |
| 2013/0327888 A1 | | 12/2013 | Gaw et al. | |

OTHER PUBLICATIONS

International Searching Authority, International Preliminary Report on Patentability, PCT Application PCT/US2016/040195, dated Jan. 11, 2018, 10 pages.

International Searching Authority, International Search Report and Written Opinion, PCT Application PCT/US2016/040195, dated Oct. 12, 2016, 15 pages.

\* cited by examiner

HYBRID WASTE TUBE ASSEMBLY

CROSS-REFERENCE TO RELATED APPLICATION(S)

This non-provisional patent application claims the benefit of and priority to U.S. Provisional Patent Application No. 62/187,098, titled Hybrid Waste Tube Assembly, and filed Jun. 30, 2015, which is incorporated herein in its entirety by reference thereto.

TECHNICAL FIELD

This patent application is directed to tubing systems, and more particularly aerospace tubing systems.

BACKGROUND

Aircraft system requirements typically set forth that internal systems, such as waste tube systems, must meet established electrical conductivity criteria. Accordingly, conventional aircraft waste tube systems are fabricated of titanium, aluminum, stainless steel, or other suitable metallic material. These conventional metal waste tube systems include thin walled tube bodies or segments with either straight, bent or branched geometries. Metallic end fittings are attached to each end portion of the tube bodies via welding or swaging. Adjacent tube segments in the waste tube system are interconnected in a substantially coaxial arrangement by a clamshell style clamp that securely engages the respective metal end fittings of the tube segments. These metallic end fittings, however, are expensive and represent the majority of the manufacturing cost of a tube section because they are often fabricated by precision machining from solid blocks of material. In addition, the metallic end fittings represent a significant portion of the weight of the tube sections. There is a need for an electrically conductive waste-tube system for use in an aircraft or the like that overcomes the above and other drawbacks experienced with conventional waste tube systems.

SUMMARY

The present technology overcomes drawbacks experienced in the prior art and provides other benefits. At least one embodiment of the present technology provides a hybrid waste tube comprising electrically conductive metal tube segments that each have a first radial engagement surface adjacent to an open end portion. Tubular, electrically conductive, non-metallic end fittings each have a second radial engagement surface. Each end fitting is fixedly connected to the open end portion of a respective one of the tube segments in an overlapping configuration with the second radial engagement surface engaging the first radial engagement surface. A clamping assembly is connected to the end fittings on adjacent, axially aligned tube segments. The clamping assembly sealably interconnects the end fittings with adjacent tube segments aligned to contain and allow a flow of material therethrough. The clamping assembly has an electrically conductive bridge engaging the adjacent end fittings and maintaining electrical continuity across the adjacent tube segments and end fittings.

Another embodiment of the present technology provides a tubular, electrically conductive, non-metallic end fitting having proximal and distal end portions. The distal end portion has an exterior surface defining an outer diameter and an interior engagement surface configured to engage an outer surface of an electrically conductive tube segment in an overlapping configuration. The distal end portion further comprises a radially outwardly extending first flange projecting from the exterior surface and a radially outwardly extending second flange projecting from the exterior surface and spaced axially from the first flange. The first and second flanges defining a seal receiving area. The distal end portion further comprising a radially inwardly extending flange projecting from the interior surface, wherein the first or second flange is configured to engage a clamping assembly to maintain axial alignment between adjacent end fittings. The end fitting is configured to maintain electrical continuity between itself, the metal tube segments, and the clamping assembly.

Another embodiment provides a conductive waste tube assembly, comprising electrically conductive tube segments that each have a first radial engagement surface adjacent to an open end portion. Tubular, electrically conductive, non-metallic end fittings each have a second radial engagement surface. Each end fitting is fixedly connectable to the open end portion of a respective one of the tube segments in an overlapping configuration with the second radial engagement surface capable of engaging the first radial engagement surface. A clamping assembly is connectable to the end fittings on adjacent, axially aligned tube segments. The clamping assembly is configured to sealably interconnect the end fittings and align adjacent tube segments to contain and allow a flow of material therethrough. The clamping assembly has an electrically conductive bridge capable of engaging the adjacent end fittings and maintaining electrical continuity across the adjacent tube segments and end fittings.

BRIEF DESCRIPTION OF THE DRAWINGS

Embodiments of the hybrid waste tube assemblies introduced herein may be better understood by referring to the following Detailed Description in conjunction with the accompanying drawings, in which like reference numerals indicate identical or functionally similar elements.

Figure 1:
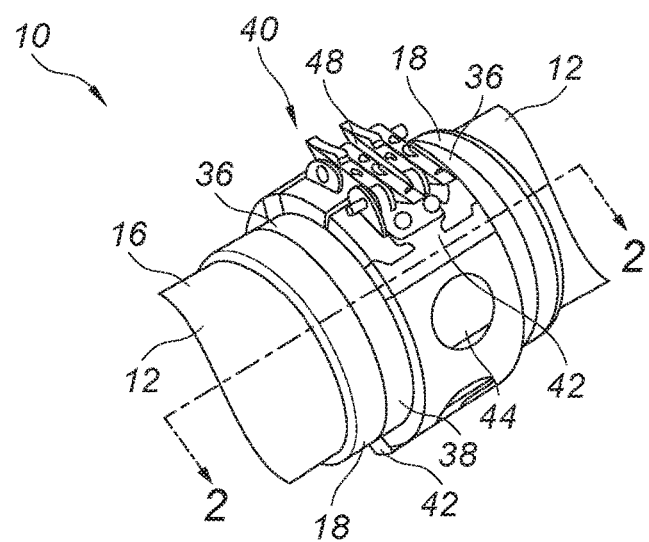
FIG. 1 is an isometric view of a conductive, hybrid waste tube system for use in an aircraft in accordance with an embodiment of the present technology.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

One or more hybrid waste tube systems are disclosed for use in an aerospace environment, such as in an aircraft. The system of one or more embodiments is configured for the transport of gaseous, liquid and solid materials through a series of independent tubular sections, wherein each section is constituted of a known electrically conductive, metallic tubular body with permanently attached electrically conductive, non-metallic fittings on each of the free ends, which sections are either joined together or joined to other components possessing suitable geometries by a coupling device that provides a joint such that the sections can be subjected to limited translation along their mutually shared axis and to limited angular deflection relative to each other while maintaining acceptable levels of material containment, pressure integrity and electrical conductivity between the tube bodies across the coupling. The hybrid waste tube system in accordance with the disclosure herein dramatically reduces the cost of the end fittings and hence, the tube system, along with an attendant weight reduction.

A hybrid waste tube system in accordance with one or more embodiments comprises electrically conductive tube segments that each have at least one tubular open end portion. The tubular end portion is fixedly connected to a tubular, electrically conductive, non-metallic end fitting. A sleeve and clamp assembly is connectable to the end fittings on adjacent, axially aligned tube segments to securely and sealably hold the tube segments together to contain and allow a flow of gas, liquid, and/or solid waste material to move through the waste tube system while maintaining an electrical resistance of approximately 1.0 ohm or less across the joint between adjacent metal tube segments and end fittings. The sleeve and clamp assembly can have an electrically conductive bridge member, such as a bonding strip or the like, connected to each non-metallic end fitting to provide electrical continuity across the clamp assembly and the joint between the non-metallic end fittings. Each end fitting is positioned in an overlapping arrangement with the end portion of the respective conductive tube segment and is securely and permanently fixed to the tube segment with an electrically conductive adhesive. Accordingly, intimate contact is maintained between the tube segment and the conductive, non-metallic end fitting so as to "collect" sufficient conducting paths therebetween to ensure that acceptable conductivity with low electrical resistance is maintained at that interface over the life of the system.

In at least one embodiment, the conductive end fitting carries a metallic conductive contact feature at a position so that the conductive bridge member from the clamp assembly directly engages a contact surface of the contact feature to provide a sufficient "collecting" area to reduce the resistance across the respective joint interfaces. The conductive contact feature can be fixed to the end fitting with an electrically conductive adhesive. Accordingly, the conductive, non-metallic end fitting is located between the electrically conductive surface and the metal tube segment. Thus, the continuous, low resistance electrical path between adjacent metal tube segments is across the conductive bridge member, through its contact surface and its conductive adhesive layer, through the conductive, non-metallic end fitting and its adhesive layer, and to the end portion of the respective metal tube segment. The adhesively bonded interfaces maintain the intimate contact between the joined components and the associated electrical conductivity between the surfaces, even under adverse environmental conditions.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 2:
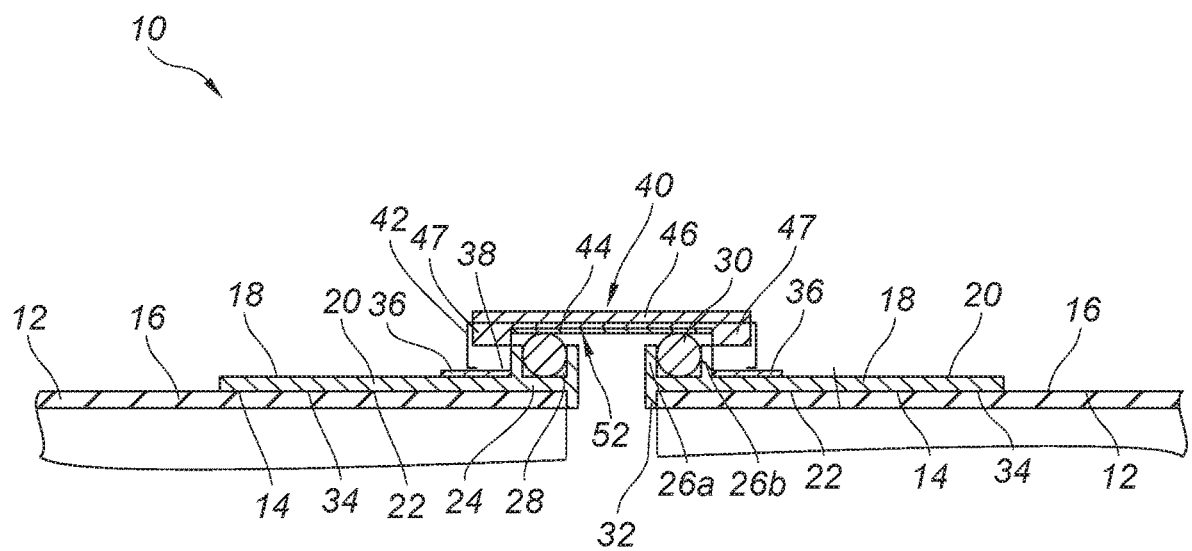
FIG. 2 is an enlarged cross-sectional view of the hybrid waste tube system taken substantially along line 2-2 of FIG. 1.
Figure 3:
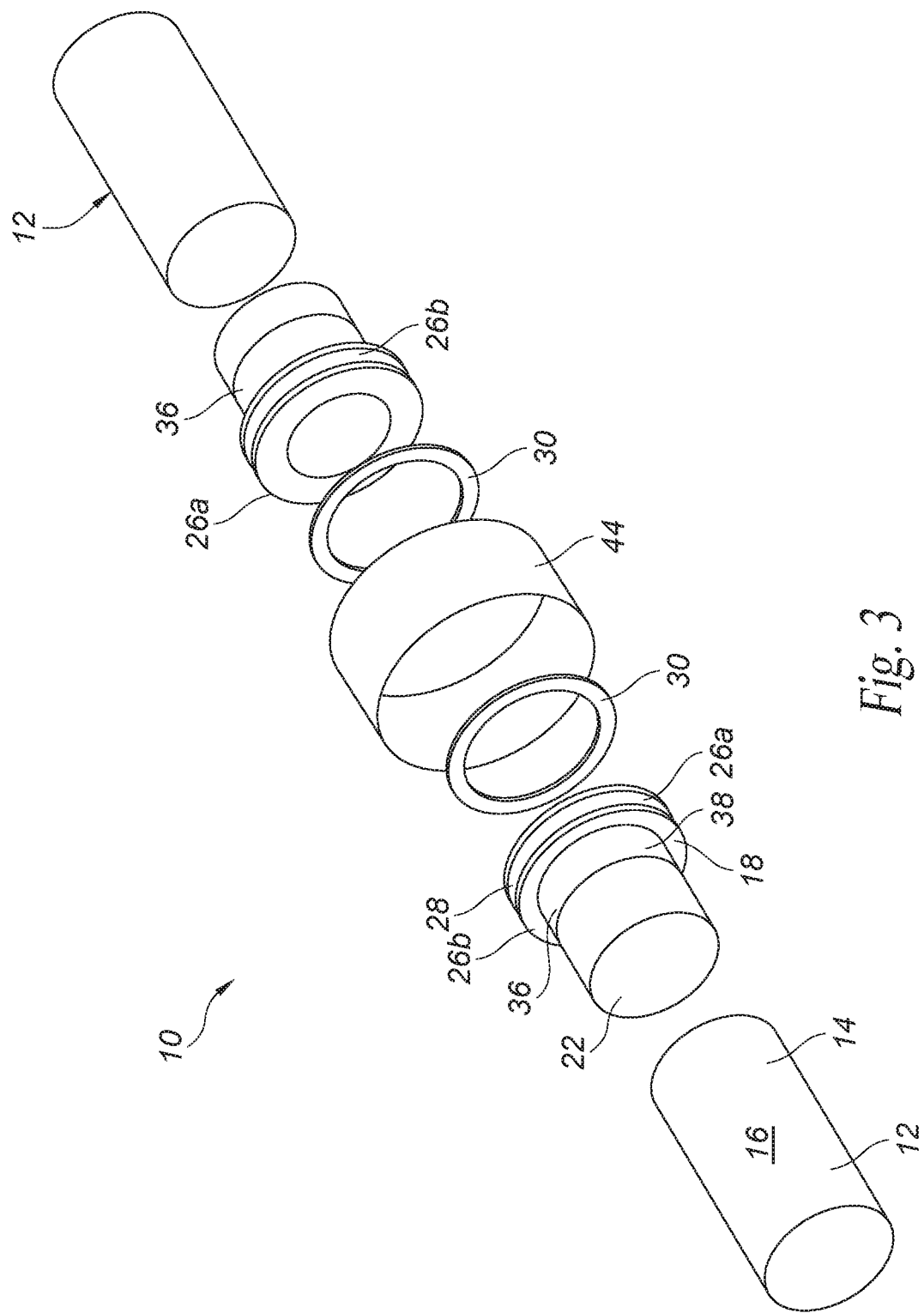
FIG. 3 is a schematic, partially exploded view of the hybrid waste tube system of FIG. 1.

FIG. 1 illustrates a conductive, hybrid waste tube system 10 for use in an aircraft in accordance with an embodiment of the present technology. FIGS. 2 and 3 are cross-sectional and schematic, partially exploded views, respectively, of the hybrid waste tube system 10 of FIG. 1. The system 10 has a plurality of electrically conductive, metal waste tube segments 12 that each have an open end portion 14 with an exterior surface 16 defining the outer diameter of the end portion 14. In the illustrated embodiment, the tube segments 12 are conventional thin-walled, titanium tubes, although other metal or electrically conductive non-metallic materials can be used. Each tube segment 12 is connected to an electrically conductive, non-metallic, tubular end fitting 18 that has an inner diameter substantially corresponding to the outer diameter of the tube segment's end portion 14.

Each end fitting 18 is permanently attached to a respective tube segment 12 in an overlapping configuration. The end portion 14 of the tube segment extends into the open proximal end 20 of the end fitting 18 with the interior surface 22 of the end fitting engaging the exterior surface 16 of the tube segment 12. In the illustrated embodiment, the end fittings 18 are made of a highly electrically conductive, aerospace grade polymeric material with metallic or carbon fill. For example, the end fittings 18 can be made of a selected Nylon (e.g., Nylon 6, Nylon 6/6, Nylon 12, Nylon 9, etc.) or other polyamide material or blend of materials, containing electrically conductive particles and/or fibers, such as carbon nanotubes, carbon fibers, Nickel or other metallic coated carbon fibers or other conductive compounds in sufficient quantity and concentration such that the non-metallic end fitting 18 has a volume resistivity in the range of approximately 100 ohm-cm or less. The end fittings 18 can be fabricated using injection molding, extrusion and machining and/or further assembly, turning, 3-D printing, or other suitable manufacturing techniques.

In another embodiment, portions of the end fittings 18 can be made of non-conductive polymeric materials with suitably conductive features fabricated either as part of an end fitting and/or additional components to provide the conductivity through the end fittings and the conductive adhesive to the metallic tube segments 12. For example, the end fitting 18 can be fabricated so that contiguous portions of the conductive adhesive material is exposed at the outer surface of the end fitting and through the end fitting 18 to provide the electrical path via the conductive adhesive material fully through the end fitting 18 to the tube segment 12. In other embodiments, the non-metallic end fitting 18 can have other features that provide conductivity through the fitting, wherein the features can be fabricated as part of end fitting 18 or as additional components so as to provide conductive paths through the metal tube segment 12, the end fittings, and across the joint therebetween, as discuss further below. The end fitting 18 can also include other highly conductive features that increase the conductivity through the end fitting 18, such as pathways fabricated as integral portions of the end fitting to define pathways for conductive adhesives and/or other conductive elements provided with the end fitting 18.

Figure 4:
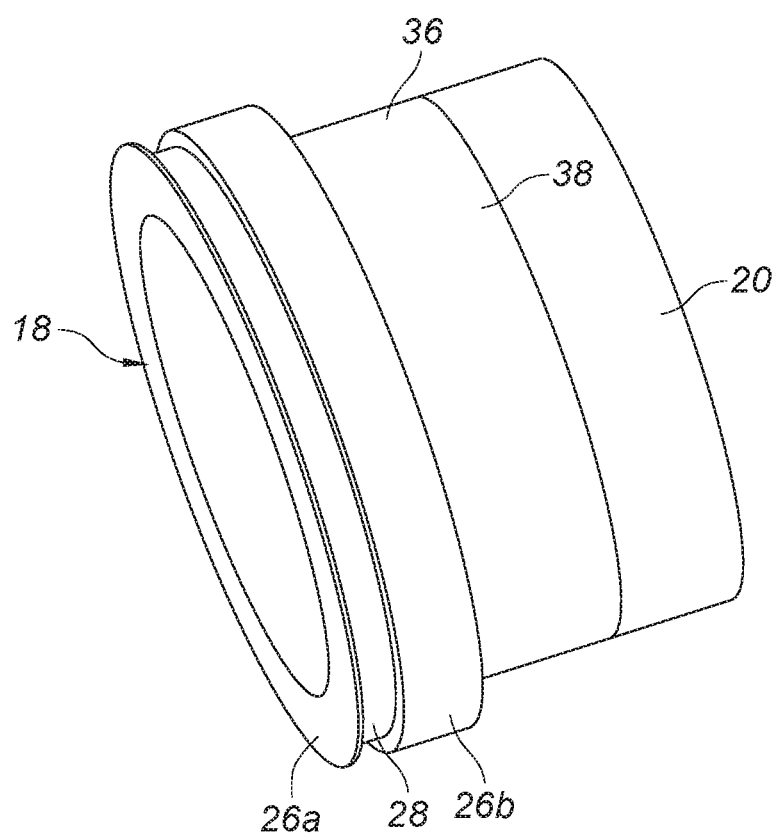
FIG. 4 is an enlarged isometric view of a conductive, non-metallic end fitting of the waste tube system of FIG. 1 shown removed from the metal waste tube segment.

As seen in FIGS. 2 and 4, the distal end 24 of the conductive end fitting 18 is a thin-walled tubular section with a pair of radially outwardly extending flanges 26a and 26b. One flange 26a is located at one end of the tubular section, and the other flange 26b is spaced axially from the first flange 26a so as to define a seal cavity or receiving area 28 that contains an O-ring 30 or other seal member. In the illustrated embodiment, the end fitting's distal end 24 also has a radially inwardly extending flange 32 that defines a shoulder structure against which the end of the tube segment 12 abuts. This inner flange 32 is configured to block axial movement of the end fitting 18 past the distal end of the tube segment 12 and to ensure correct installation and positioning of the end fitting 18 on the tube segment 12.

The end fitting 18 is permanently affixed to the end portion 14 of the tube segment 12 with an electrically conductive adhesive 34 bonded to the tube segment's exterior surface 16 and the end fitting's interior surface 22. In the illustrated embodiment, the electrically conductive adhesive can be a silver or nickel filled epoxy with a volume resistivity of approximately 0.05 ohm-cm or less, although silver coated ceramic fills or other suitable conductive adhesive material can be used that provide sufficient conductivity when in "contact" with the electrically conductive, non-metallic end fitting 18. This embodiment maintains permanent, consistent, highly conductive interfaces between the components without relying on contact pressure alone between the components. Experience has shown that using contact pressure alone between conductive polymeric material elements is not sufficient to ensure consistent low resistance levels (i.e., approximately 1 ohm or less resistance across the joint) required in modern aircraft tubing systems. In addition, contact pressures between materials, and in particular polymeric based materials, can vary over time and are subject to environmental changes. These changing conditions make it extremely difficult to consistently maintain the original resistance levels of a base tube system.

In other embodiments, the end fitting 18 can be permanently affixed to the tube segment's end portion 14 via a pressure fit configuration via radial expansion of the tube segment. In another embodiment, the end fitting 18 can be permanently affixed to the tube segment's end portion 14 via a mechanical means, such as a tube flare and/or a wedged interface, and the end fitting can include suitably conductive features fabricated either as part of an end fitting and/or additional components, as discussed above, to provide the conductivity through the end fitting 18 to the metallic tube segment 12 to ensure electrical conductivity is maintained throughout the lifetime of the system. Other embodiments can include an adhesive/charge collecting layer between the end fitting 18 and tube segment 12 to maintain conductivity, while the primary mechanical strength in the joint is provided by the flare and/or wedge interface.

Referring to FIGS. 2 and 4, a conductive contact feature 36 is attached to the tubular portion of the end fitting 18 adjacent to the second flange 26b. The conductive contact feature 36 of the illustrated embodiment is an electrically conductive ring bonded to the exterior surface of the end fitting 18 with a conductive adhesive. The conductive contact feature 36 of the illustrated embodiment is a thin, flat ring that defines a conductive contact surface 38. In other embodiments, the conductive contact feature 36 can be integrally embedded into the outer surface of the end fitting 18. The contact feature 36, however, does not extend fully through the end fitting 18, such that at least a portion of the end fitting 18 is located radially between the contact feature 36 and the exterior surface 16 of the tube segment's end portion 14. The contact feature 36 also defines a wear resistant surface against which a clamp assembly 40 and/or conductive bridge member 42 can bear, as discussed in greater detail below. In the illustrated embodiment, the contact feature 36 is made of a flat, annular strip of corrosion resistant, such as a titanium or other metal material similar to the material of the tube segment, although corrosion resistant conductive wire or other highly electrically conductive materials can be used.

Figure 5:
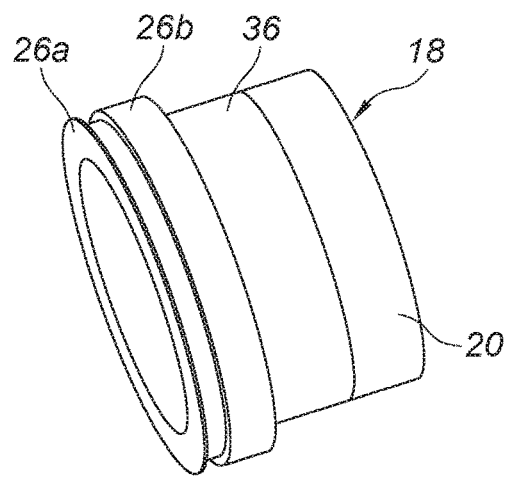
FIG. 5 is an isometric view of an embodiment of the conductive, non-metallic end fitting of the waste tube system of FIG. 1 shown removed from the metal waste tube segment.
Figure 6:
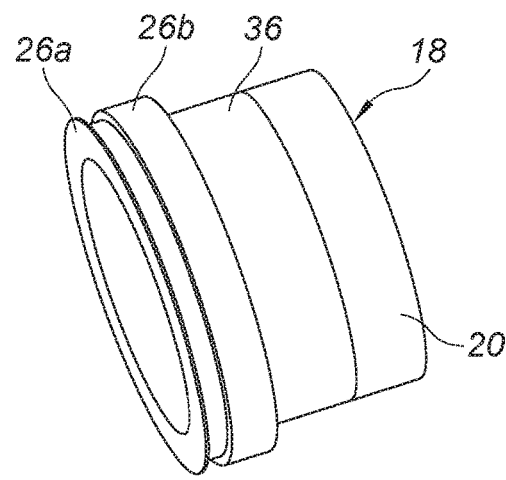
FIG. 6 is an isometric view of another embodiment of the conductive, non-metallic end fitting of the waste tube system of FIG. 1 shown removed from the metal waste tube segment.
Figure 7:
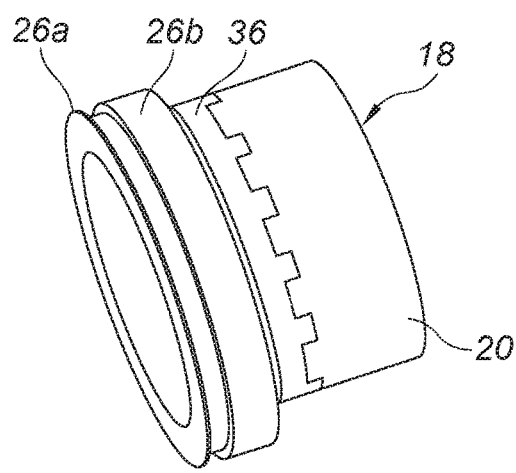
FIG. 7 is an isometric view of another embodiment of the conductive, non-metallic end fitting of the waste tube system of FIG. 1 shown removed from the metal waste tube segment.
Figure 8:
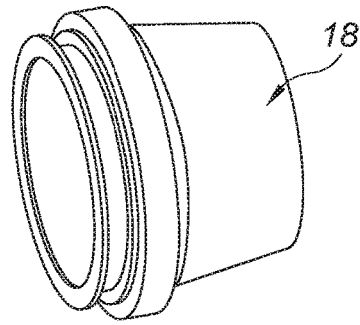
FIG. 8 is an isometric view of an embodiment of the conductive, non-metallic end fitting of the waste tube system of FIG. 1 shown removed from the metal waste tube segment.

FIG. 5 is an isometric view of an embodiment of the end fitting 18 shown removed from the metal waste tube segment. In this embodiment, the conductive contact feature 36 is integrally molded into the conductive polymeric material forming the end fitting 18. FIG. 6 illustrates another embodiment wherein the conductive contact feature 36 is formed by a metalized surface portion of the end fitting 18 adjacent to the proximal flange 26b. FIG. 7 illustrates another embodiment wherein the end fitting 18 has integrally molded conductive features molded into non-conductive plastic portions of the end fitting and electrically connect to the tube segment 12 to which the end fitting 18 is attached. FIG. 8 is an isometric view of an end fitting 18 of another embodiment, wherein the end fitting 18 can have a partially conical-shaped fitting geometry, or other selected fitting geometry for use with the thin walled, electrically conductive metal tube segments.

Referring again to FIG. 2, two tube segments 12 are shown positioned immediately adjacent to each other with their respective end fittings 18 immediately adjacent to each other and in axial alignment. A durable cylindrical sleeve 44 is positioned around the aligned adjacent end fittings 18, such that the sleeve 44 covers the flanges 26a/26b and O-rings 30 of the adjacent end fittings 18. The two adjacent end fittings 18 are securely held together by a clamp assembly 40 that wraps around the cylindrical sleeve 44 and receives and/or engages at least portions of the radial flanges 26a/26b of each end fitting 18. In the illustrated embodiment of FIGS. 1-3, sleeve 44 is shaped and sized to press against and partially compressed the O-rings so as to create a seal across the joint between the end fittings 18 sufficient to maintain the pressure and vacuum loads within the system 10 during operation. This sealed interface between the components ensures that the gas, liquid, and/or solids flowing through the interconnected tube segments 12 and end fittings 18 will not leak during operation at the corresponding joint. The sleeve 44 of the illustrated embodiment is made of titanium, although the sleeve 44 can be made of other suitable materials to maintain the requisite sealed engagement. Accordingly, the properly installed conductive hybrid waste tube system 10 provides the material containment, pressure integrity, joint flexibility and electrical continuity (specifically resistance across the joint of approximately 1 ohm or less) demanded of aircraft plumbing systems.

The clamp assembly 40 as illustrated in FIG. 1 is a clam-shell type clamp having two semi-cylindrical strap portions 46 pivotally attached at one end via a hinge or other pivot mechanism that allows the clamp assembly 40 to move between open and closed positions. In the open position, the clamp assembly 40 can be placed around or removed from the end fittings 18 on the tube segments 12. In the closed position, the clamp assembly 40 is sized and configured to extend around the circumference of the sleeve 44 and the end fittings 18, so as to capture the radial flanges 16 and hold the end fittings 18 and associated tube segments 12 together in substantial axial alignment.

In the illustrated embodiment, the semi-cylindrical strap portions 46 have a pair of radially inwardly extending, annular shoulder portions 47 spaced apart from each other to define a receiving area 52 sized to receive the radial flanges 26a/26b on the adjacent end fittings 18. Accordingly, the shoulder portions 47 interfere with axial translation of the radial flanges, thereby preventing excessive axial movement of the joined end fittings 18 away from each other.

The clamp assembly 40 is locked in the closed position when installed on the end fittings 18 by a conventional positive locking member 48 that prevents inadvertent opening of the clamp assembly 40. The locking member 48 is also configured to allow a person to accurately and easily determine visually whether the clamp assembly is open or locked closed. In the illustrated embodiment, the clamp assembly 40, the sleeve 44, the radial flanges 26a/26b of the end fittings 18, and the O-rings 30 are sized and configured to allow for relative angular deflection of the joint end fittings 18 and tube segments 12 in the range of approximately 4°. This configuration also allows for a minimal amount of axial movement of the joined tube segments (and associated end fittings 18) relative to each other (e.g., axial movement of the tube ends up to approximately 0.25 inches of each other), while maintaining adequate stiffness and structural integrity during operation of the system 10 and/or the associated aircraft.

The clamp assembly 40 of the illustrated embodiment has one or more electrically conductive bridge members 42 connected to the strap portions 46 and positioned to physically engage the flat conductive contact surface 38 of the contact features 36 on the end fittings 18. The conductive bridge members 42 span across the clamp assembly 40 and define the electrically conductive path across the joint between the end fittings 18. Each conductive bridge member 42 of the illustrated embodiment can be titanium, stainless steel, aluminum, or other thin metal channel having a C-shaped cross-sectional shape (FIG. 2) with radially inward flanges in the direct engagement with the conductive contact features 36 on the end fittings 18. Other electrically conductive bridge members 42, such as highly conductive wires, ribbons, clips, or the like, can be used in other embodiments to define a conductive path across the joint between the adjacent end fittings 18.

When the clamp assembly 40 is in the closed position, the clamp assembly causes radially inward clamping forces that maintain consistent engagement between the conductive bridge members 42 and the conductive contact features 36 on the end fittings 18. Accordingly, the electrical path across the joint between two tube segments 12 is from a first tube segment 12, through the layer of conductive adhesive 34, through the first conductive, non-metallic end fitting 18, through the conductive contact feature 36, across the conductive bridge member 42 of the clamp assembly 40, through the conductive contact feature 36 on the other adjacent end fitting 18, through the nonmetallic, conductive material of the second end fitting, through the layer of conductive adhesive 34, and to the second tube segment 12 coaxially aligned with the first tube segment. This arrangement and associated components are configured to provide a resistance of approximately 1.0 ohm or less across the joint.

Figure 9:
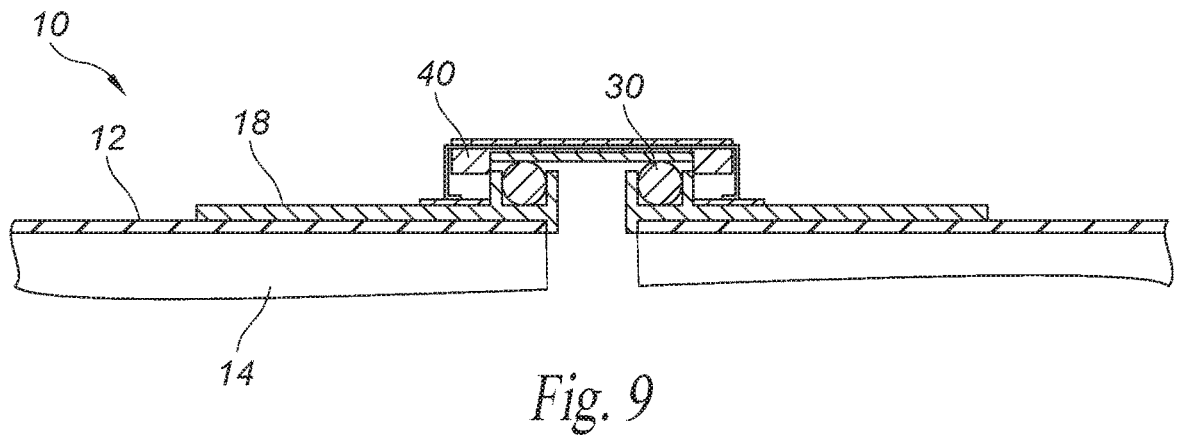
FIG. 9 is a cross-sectional view of an embodiment of the hybrid waste tube system for use in a low-load environment in accordance with an embodiment of the present disclosure.
Figure 10:
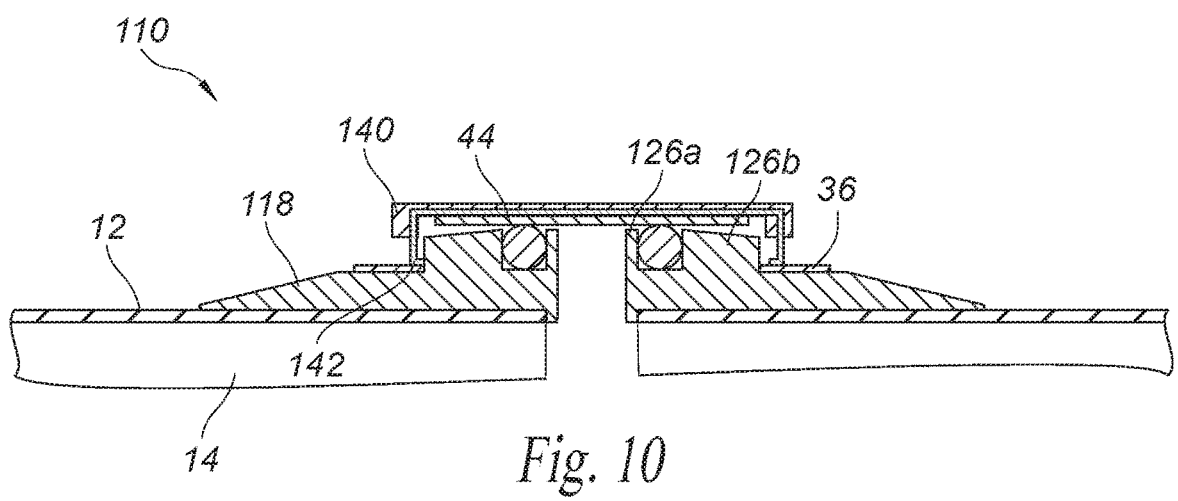
FIG. 10 is a cross-sectional view of an embodiment of the hybrid waste tube system for use in a high-load environment in accordance with another embodiment of the present disclosure.

The hybrid waste tube system 10 described above and illustrated in FIGS. 2 and 9 have thin walled end fittings 18 that fit over the end portions of the thin wall metallic tube segments 12, which provides a configuration for use in a relatively low-load environment and in configurations in which the hybrid waste tube system 10 must interface with end fittings from conventional metallic waste tube systems. For example, the illustrated waste tube system 10 is configured for use in environments that may result in axial tensile loads of approximately 1,000 pounds or less applied to components of the system 10. As illustrated in FIG. 10, an alternative embodiment provides a hybrid waste tube system 110 for use in a high-load environment that may result in axial tensile loads of more than approximately 1000 pounds applied to components of the system. In this high-load embodiment, the electrically conductive, non-metallic end fitting 118 that attaches to the end portion 14 of the tube segment is thicker radially as compared to the end fitting 18 for the low-load configuration. In addition, the proximal flange 126b of the end fitting 118 is thicker and stronger than the proximal flange 26b of the low-load configuration. The sleeve 44 and the clamp assembly 140 are also larger, stronger, and more sturdy than the corresponding components described above so as to handle or otherwise accommodate the larger loads that may be applied to the system 110 during use.

Figure 11:
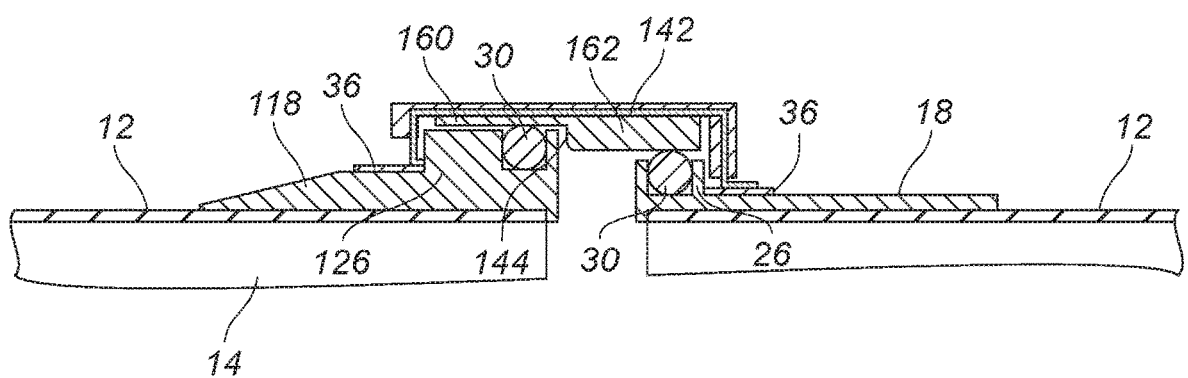
FIG. 11 is a cross-sectional view of an embodiment of the hybrid waste tube system for use in a transitional load environment in accordance with another embodiment of the present disclosure.

FIG. 11 is a cross-sectional view of another embodiment of the hybrid waste tube system for a transition connection between high-load and low-load end fittings 118 and 18, respectively. In this embodiment, the end of one tube segment 12 has an end fitting 118 for use in the high-load configuration, and the other tube segment 12 has an end fitting 18 for use in the low-load configuration. In this embodiment, a sleeve 144 is used that has a radially thin portion 160 configured to engage the O-ring 30 contained between the flanges 126a/126b of the high-load end fitting configuration. The sleeve also has a radially thick portion 162 configured to engage the O-ring 30 contained between the flanges 26a/26b of the low-load end fitting configuration. The strap portion 146 of the clamp assembly 140 and the bridge members 142 have a configuration similar to those described above, but one side is radially shorter to operatively engage the high-load end fitting 118 and the associate conductive contact feature 36. The other side is radially longer to operatively engage the low-load end fitting 18 and its associated conductive contact feature 36. This transition configuration ensures electrical conductivity continuity is maintained across the joint if a system transitions between high and low-load arrangements.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A hybrid waste tube assembly, comprising:
   electrically conductive metal tube segments that each have a first radial engagement surface adjacent to an open end portion;
   tubular, electrically conductive, non-metallic end fittings each having a second radial engagement surface, each end fitting being fixedly connected to the open end portion of a respective one of the tube segments in an overlapping configuration with the second radial engagement surface engaging the first radial engagement surface, wherein each end fitting includes a proximal end portion and a distal end portion, the distal end portion having a radially inwardly extending flange abutting the open end portion of a respective one of the tube segments;
   electrically conductive contact features, each contact feature being affixed to a respective one of the non-metallic end fittings and having a conductive contact surface, each contact feature formed of a material different than the non-metallic end fittings;
   a clamping assembly connected to the end fittings on adjacent, axially aligned tube segments and providing an electrically conductive path across the adjacent tube segments and end fittings, the clamping assembly sealably interconnecting the end fittings with adjacent tube segments aligned to contain and allow a flow of material therethrough, the clamping assembly having an electrically conductive bridge spanning across the clamping assembly and engaging the conductive contact surface of each contact feature to define at least a portion of the electrically conductive path across the adjacent tube segments and end fittings; and
   a plurality of seals, each engaging a respective one of the end fittings and being configured to allow for at least some angular deflection of the end fittings relative to each other.

2. The assembly of claim 1 wherein the first radial engagement surface is an exterior surface defining an outer diameter of the tube segment, and the second radial engagement surface is an interior surface defining an inner diameter of the end fitting, wherein the end fitting is positioned around the outer diameter of the tube segment.

3. The assembly of claim 1, further comprising an electrically conductive adhesive bonding the contact feature to the end fitting.

4. The assembly of claim 3 wherein the contact feature is formed by a metalized surface portion of the non-metallic end fitting.

5. The assembly of claim 3 wherein the contact feature is integrally molded into electrically conductive, non-metallic material forming at least a portion of the end fitting.

6. The assembly of claim 1 wherein the end fitting is made of a conductive, polymeric material.

7. The assembly of claim 1 wherein the end fitting is permanently connected to the tube segment with an electrically conductive adhesive positioned between the first and second engagement surfaces.

8. The assembly of claim 1 wherein the distal end portion of each end fitting further comprises a radially outwardly extending first flange and a radially outwardly extending second flange spaced axially from the first flange.

9. The assembly of claim 8 wherein the clamping assembly further comprises a first radially inwardly extending shoulder portion and a second radially inwardly extending shoulder portion spaced axially apart from the first radially inwardly extending shoulder portion to define a receiving area sized to receive therein the radially outward extending first flanges of the end fittings.

10. The assembly of claim 1 wherein the end fitting is permanently affixed to the tube segment.

11. A hybrid waste tube assembly, comprising:
    electrically conductive metal tube segments that each have a first radial engagement surface adjacent to an open end portion;
    tubular, electrically conductive, non-metallic end fittings each having a second radial engagement surface, each end fitting being fixedly connected to the open end portion of respective one of the tube segments in an overlapping configuration with the second radial engagement surface engaging the first radial engagement surface, wherein each end fitting includes a proximal end portion and a distal end portion, the distal end portion having a radially inwardly extending flange abutting the open end portion of a respective one of the tube segments;

electrically conductive contact features, each contact feature being affixed to a respective one of the end fittings and having a conductive contact surface, wherein the contact feature is a ring bonded to the end fitting with an electrically conductive adhesive;

a clamping assembly connected to the end fittings on adjacent, axially aligned tube segments and providing an electrically conductive path across the adjacent tube segments and end fittings, the clamping assembly sealably interconnected the end fittings with adjacent tube segments aligned to contain and allow a flow of material therethrough, the clamping assembly having an electrically conductive bridge spanning across the clamping assembly and engaging the conductive contact surface of each contact feature to define at least a portion of the electrically conductive path across the adjacent tube segments and end fittings; and a plurality of seals, each engaging a respective one of the end fittings and being configured to allow for at least some angular deflection of the end fittings relative to each other.

12. A tubular, electrically conductive, non-metallic end fitting, comprising:

proximal and distal end portions, the distal end portion having an exterior surface defining an outer diameter and an interior engagement surface configured to engage an outer surface of an electrically conductive tube segment in an overlapping configuration;

the distal end portion further comprising a radially outwardly extending first flange projecting from the exterior surface and a radially outwardly extending second flange projecting from the exterior surface and spaced axially from the first flange, the first and second flanges defining a seal receiving area;

the distal end portion further comprising a radially inwardly extending first flange projecting from the interior surface and being configured to about an open end portion of the tube segment;

wherein the first or second flange being configured to engage a clamping assembly to maintain axial alignment between adjacent end fittings;

an electrically conductive contact feature bonded to the exterior surface of the distal end portion with an electrically conductive adhesive, the contact feature having a conductive contact surface configured to engage with the clamping assembly, wherein the contact feature is a metal ring; and wherein the end fitting is configured to maintain electrical continuity between itself, the metal tube segments, and the clamping assembly.

13. A conductive waste tube assembly, comprising:

electrically conductive tube segments that each have a first radial engagement surface adjacent to an open end portion;

tubular, electrically conductive, non-metallic end fittings each having a second radial engagement surface, each end fitting being fixedly connectable to the open end portion of a respective one of the tube segments in an overlapping configuration with the second radial engagement surface capable of engaging the first radial engagement surface, each end fitting including a proximal end portion and a distal end portion, the distal end portion having a radially inwardly extending flange and a radially outwardly extending flange, wherein the radially inwardly extending flange abuts the open end portion of a respective one of the tube segments;

electrically conductive contact features, each contact feature being affixed to a respective one of the non-metallic end fittings and having a conductive contact surface, each contact feature formed of a material different than the non-metallic end fittings;

a clamping assembly having a first radially inwardly extending shoulder portion and a second radially inwardly extending shoulder portion spaced axially from the first radially inwardly extending shoulder portion to define a receiving area sized to receive the radially outward extending flanges of the end fittings on the adjacent, axially aligned tube segments, the clamping assembly being connectable to the end fittings and providing an electrically conductive path across the tube segments and end fittings, the clamping assembly configured to sealably interconnect the end fittings and align adjacent tube segments to contain and allow a flow of material therethrough, the clamping assembly having an electrically conductive bridge spanning across the clamping assembly and capable of engaging the conductive contact surface of the contact feature to define at least a portion of the electrically conductive path across the adjacent tube segments and end fittings; and a plurality of seals, each seal configured to sealably engage a respective one of the end fittings and being configured to allow for at least some angular deflection of the end fittings relative to each other.

* * * * *